(12) United States Patent
Nara et al.

(10) Patent No.: US 10,720,660 B2
(45) Date of Patent: Jul. 21, 2020

(54) FUEL CELL STACK

(71) Applicant: HONDA MOTOR CO., LTD., Tokyo (JP)

(72) Inventors: Yusuke Nara, Wako (JP); Motohiro Takahashi, Wako (JP); Daisuke Okonogi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 124 days.

(21) Appl. No.: 15/453,905

(22) Filed: Mar. 9, 2017

(65) Prior Publication Data

US 2017/0263969 A1 Sep. 14, 2017

(30) Foreign Application Priority Data

Mar. 9, 2016 (JP) .................................. 2016-045376

(51) Int. Cl.
| | |
|---|---|
| *H01M 8/2483* | (2016.01) |
| *H01M 8/0267* | (2016.01) |
| *H01M 8/2475* | (2016.01) |
| *H01M 8/0206* | (2016.01) |
| *H01M 8/2484* | (2016.01) |
| *H01M 8/04007* | (2016.01) |
| *H01M 8/1018* | (2016.01) |

(52) U.S. Cl.
CPC ....... *H01M 8/2483* (2016.02); *H01M 8/0206* (2013.01); *H01M 8/0267* (2013.01); *H01M 8/04007* (2013.01); *H01M 8/2475* (2013.01); *H01M 8/2484* (2016.02); *H01M 2008/1095* (2013.01); *H01M 2250/20* (2013.01); *Y02T 90/32* (2013.01)

(58) Field of Classification Search
CPC ............. H01M 8/2483; H01M 8/0206; H01M 8/0267; H01M 8/2475; H01M 8/04007; H01M 8/2484; H01M 8/2415
See application file for complete search history.

(56) References Cited

U.S. PATENT DOCUMENTS

| | | | | |
|---|---|---|---|---|
| 2007/0218332 | A1* | 9/2007 | Suzuki ................ | H01M 8/0267 429/434 |
| 2010/0310958 | A1* | 12/2010 | Naito .................. | H01M 8/0258 429/434 |
| 2013/0230785 | A1* | 9/2013 | Terada .............. | H01M 8/04007 429/434 |

FOREIGN PATENT DOCUMENTS

JP 2006-032054 2/2006

* cited by examiner

*Primary Examiner* — Jonathan G Jelsma
(74) *Attorney, Agent, or Firm* — Mori & Ward, LLP

(57) ABSTRACT

A fuel cell stack includes a coolant channel provided between a first separator of a first power generation cell among power generation cells and a second separator of a second power generation cell among the power generation cells which is adjacent to the first power generation cell. A coolant manifold is connected to the coolant channel. A coolant manifold end member is connected to the coolant manifold. The coolant manifold end member includes an air vent wall having an opening provided at an uppermost position of the coolant manifold end member in a height direction of the fuel cell stack. The coolant manifold end member includes a wall which surrounds the air vent wall and which is thinner than the air vent wall. The air vent pipe protrudes from the air vent wall. The air vent pipe and the coolant manifold end member are integrally made.

8 Claims, 6 Drawing Sheets

FUEL CELL STACK

CROSS-REFERENCE TO RELATED APPLICATIONS

The present application claims priority under 35 U.S.C. § 119 to Japanese Patent Application No. 2016-045376, filed Mar. 9, 2016, entitled "Fuel Cell Stack." The contents of this application are incorporated herein by reference in their entirety.

BACKGROUND

1. Field

The present disclosure relates to a fuel cell stack.

2. Description of the Related Art

For example, a solid polymer electrolyte fuel cell includes a membrane electrode assembly (MEA) in which an anode electrode is disposed on one surface of an electrolyte membrane, which is a solid polymer ion-exchange membrane, and a cathode electrode is disposed on the other surface of the electrolyte membrane. The membrane electrode assembly and separators, sandwiching the membrane electrode assembly, constitute a power generation cell. Typically, a predetermined number of power generation cells are stacked to form a fuel cell stack, which is used, for example, as a vehicle fuel cell stack mounted in a fuel cell vehicle (fuel cell electric automobile or the like).

In a fuel cell, a fuel gas channel, through which a fuel gas flows to the anode electrode, and an oxidant gas channel, through which an oxidant gas flows to the cathode electrode, are formed along surfaces of the separators. Between adjacent separators, a coolant channel, through which a coolant flows, is formed along surfaces of the separators.

Some fuel cells have an internal-manifold structure. An internal-manifold fuel cell has a fuel gas manifold, an oxidant gas manifold, and a coolant manifold, each of which extends through the fuel cell in the stacking direction. The fuel gas flows through the fuel gas manifold, the oxidant gas flows through the oxidant gas manifold, and the coolant flows through the coolant manifold. The fuel gas manifold includes a fuel gas supply manifold and a fuel gas discharge manifold, the oxidant gas manifold includes an oxidant gas supply manifold and an oxidant gas discharge manifold, and the coolant manifold includes a coolant supply manifold and a coolant discharge manifold.

In the internal-manifold fuel cell, a coolant manifold end member is disposed on one of the end plates. The coolant manifold end member is connected to the coolant manifold, and the coolant is supplied or discharged through the coolant manifold end member. A coolant supply pipe for supplying the coolant from the outside or a coolant discharge pipe for discharging the coolant to the outside is connected to the coolant manifold end member.

Air may be mixed in the coolant. Therefore, there is a problem in that the air, which tends to remain in an upper region of the coolant manifold end member, may reduce cooling efficiency. For example, Japanese Unexamined Patent Application Publication No. 2006-032054 describes a fuel cell stack that addresses the problem.

The fuel cell stack includes a manifold end member having a coolant supply opening that is connected to a coolant supply manifold. The manifold end member has an air vent opening, which is connected to the coolant supply manifold, at a position higher than the coolant supply opening.

Accordingly, when a coolant is supplied to the coolant supply opening, air that is mixed in the coolant moves vertically upward from the coolant supply opening. Then, the air is smoothly and reliably discharged from the air vent hole. It is described that, with this structure, it is possible to effectively prevent entry of air into the coolant supply manifold and considerably improve the efficiency in cooling the entirety of the fuel cell stack.

SUMMARY

According to one aspect of the present invention, a fuel cell stack includes a stack of power generation cells that are stacked in a stacking direction that is a horizontal direction, each of the power generation cells including a membrane electrode assembly and separators that are stacked in the horizontal direction, the membrane electrode assembly including an electrolyte membrane and electrodes disposed on both sides of the electrolyte membrane. The fuel cell stack includes end plates that are disposed at both ends of the stack of power generation cells in the stacking direction; a coolant channel that is formed between each pair of the separators that are adjacent to each other and through which a coolant flows along surfaces of the pair of separators; and a coolant manifold that is connected to the coolant channel and through which the coolant flows in the stacking direction of the fuel cells.

The fuel cell stack includes a coolant manifold end member that is disposed on one of the end plates and that is connected to the coolant manifold; and an air vent pipe that is integrally formed with an upper part of the coolant manifold end member so as to protrude from the upper part, the air vent pipe being open at an uppermost position inside the coolant manifold end member. The coolant manifold end member includes an air vent wall from which the air vent pipe protrudes, and a thickness of the air vent wall is greater than a thickness a part of a wall of the coolant manifold end member around the air vent wall.

According to another aspect of the present invention, a fuel cell stack includes power generation cells, a coolant channel, first and second end plates, a coolant manifold, a coolant manifold end member, and an air vent pipe. The power generation cells are stacked in a stacking direction. Each of the power generation cells includes a membrane electrode assembly, and first and second separators. The membrane electrode assembly includes an electrolyte membrane and first and second electrodes. The first and second electrodes sandwich the electrolyte membrane therebetween in the stacking direction. The first and second separators sandwich the membrane electrode assembly therebetween in the stacking direction. The coolant channel is provided between the first separator of a first power generation cell among the power generation cells and the second separator of a second power generation cell among the power generation cells which is adjacent to the first power generation cell. A coolant is to flow along the coolant channel. The first and second end plates sandwich the power generation cells therebetween in the stacking direction. A coolant manifold is connected to the coolant channel and the coolant is to flow through the coolant manifold in the stacking direction. A coolant manifold end member is disposed on one of the first and second end plates and connected to the coolant manifold. The coolant manifold end member includes an air vent wall having an opening provided at an uppermost position of the coolant manifold end member in a height direction of the fuel cell stack. The coolant manifold end member includes a wall which surrounds the air vent wall and which is thinner than the air vent wall. The air vent pipe protrudes from the air vent wall. The air vent pipe and the coolant manifold end member are integrally made.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
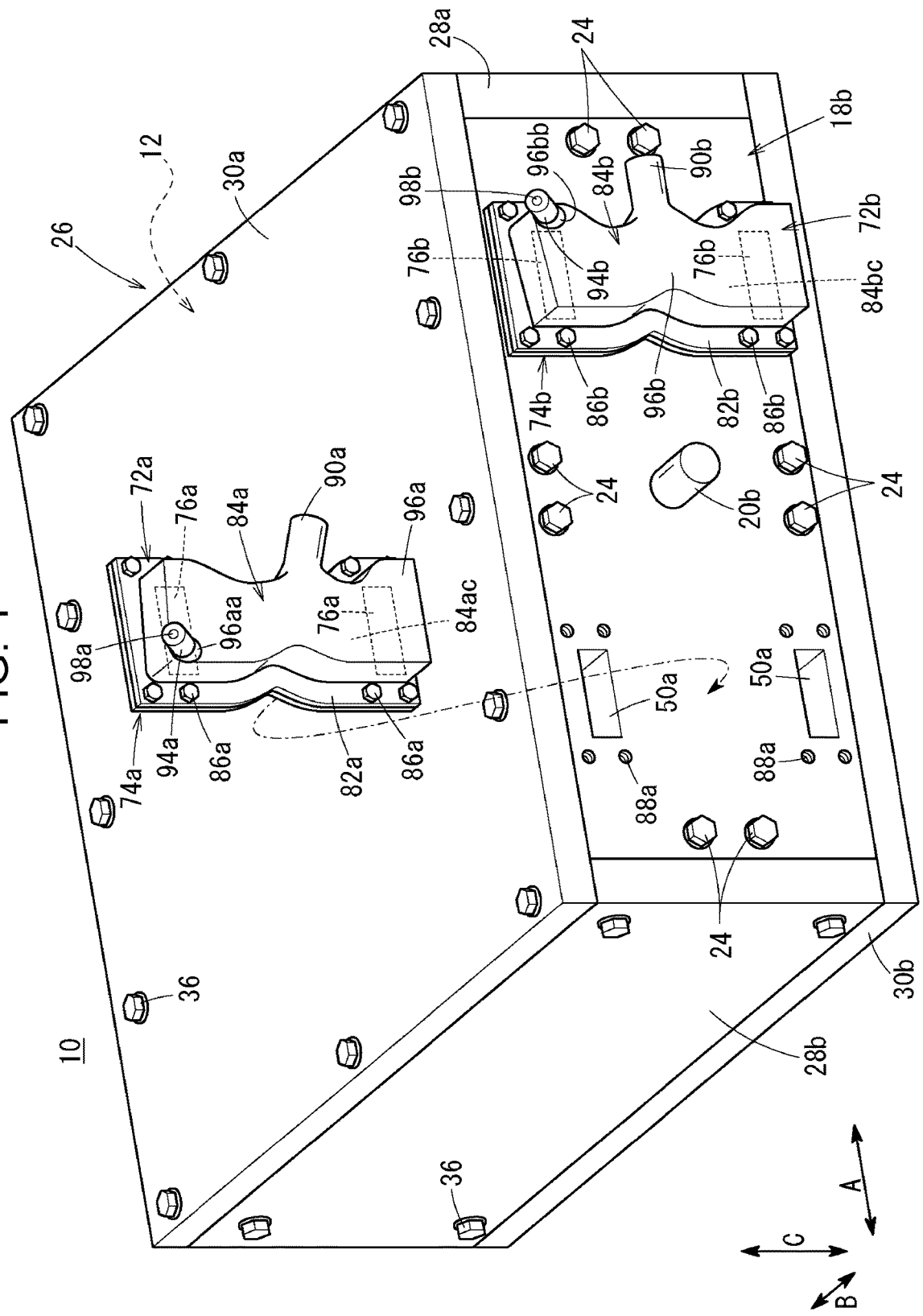
FIG. 1 is a perspective view of a fuel cell stack according to an embodiment of the present disclosure, showing coolant manifold end members.

The embodiments will now be described with reference to the accompanying drawings, wherein like reference numerals designate corresponding or identical elements throughout the various drawings.

Figure 2:
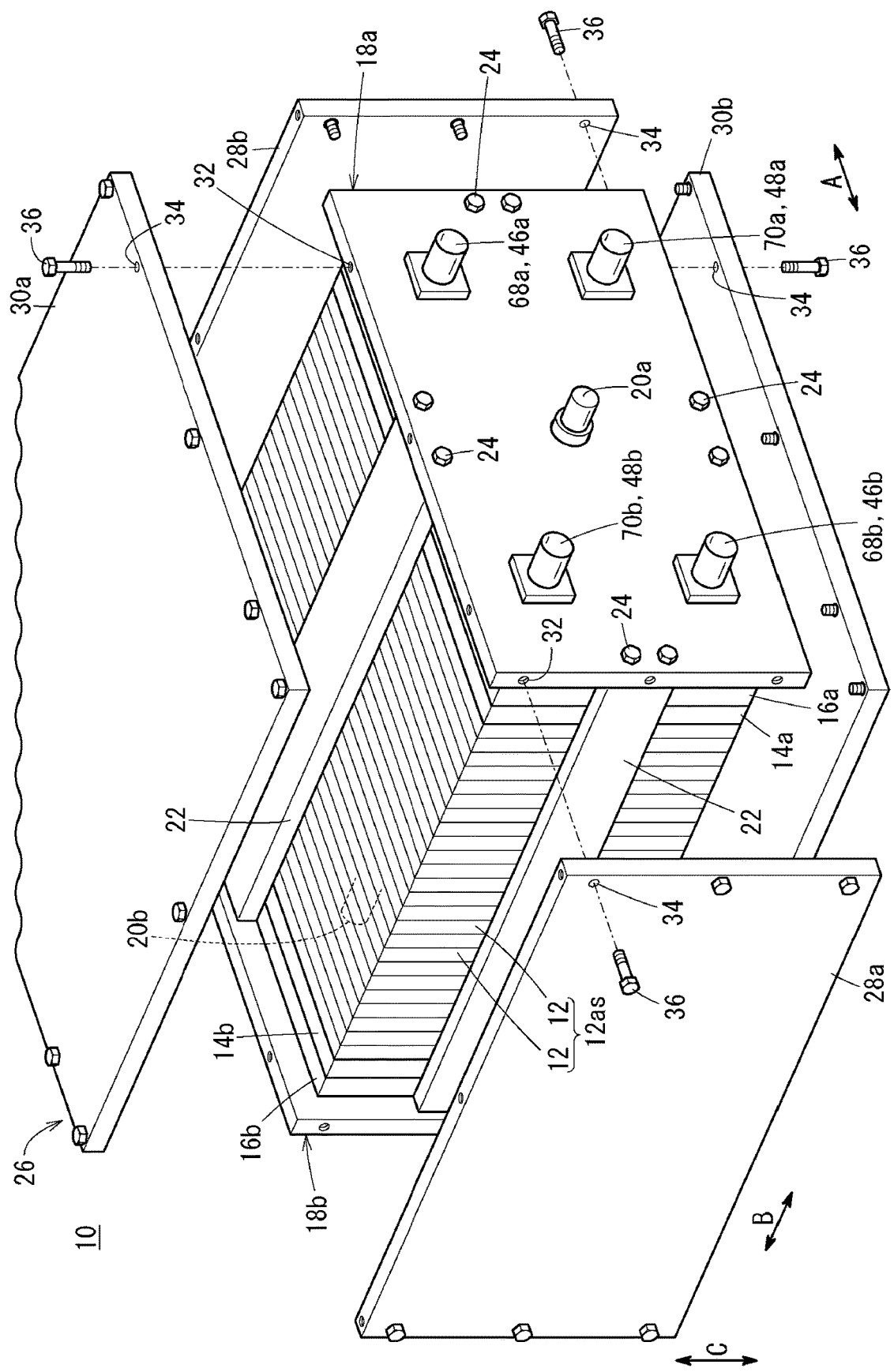
FIG. 2 is a partially exploded perspective view of the fuel cell stack.

Referring to FIGS. 1 and 2, a fuel cell stack 10 according to an embodiment of the present disclosure is mounted, for example, in a fuel cell electric automobile (not shown) as a vehicle fuel cell stack. The fuel cell stack 10 includes a stacked body 12*as*, in which a plurality of power generation cells 12 are stacked in a horizontal direction (direction of arrow B) in such way that electrode surfaces thereof are upright.

Referring to FIG. 2, at one end of the power generation cells 12 in the stacking direction (one end of the stacked body 12*as*), a first terminal plate 14*a*, a first insulation plate 16*a*, and a first end plate 18*a* are arranged outward. At the other end of the power generation cells 12 in the stacking direction (the other end of the stacked body 12*as*), a second terminal plate 14*b*, a second insulation plate 16*b*, and a second end plate 18*b* are arranged outward.

The first end plate 18*a* has a horizontally elongated (rectangular) shape. A first power output terminal 20*a*, which is connected to the first terminal plate 14*a*, extends outward from a substantially central part (or an off-center part) of the first end plate 18*a*. The second end plate 18*b* has a horizontally elongated (rectangular) shape. A second power output terminal 20*b*, which is connected to the second terminal plate 14*b*, extends outward from a substantially central part (or an off-center part) of the second end plate 18*b*.

Connection bars 22, having a uniform length, are disposed between central parts of edge portions of the first end plate 18*a* and central parts of edge portions of the second end plate 18*b*. Ends of the connection bars 22 are fixed to the first and second end plates 18*a* and 18*b* by using screws 24, thereby applying a fastening load to the stacked body 12*as* in the stacking direction (direction of arrow B).

The fuel cell stack 10 includes a casing 26, as necessary. The first end plate 18*a* and the second end plate 18*b* form two sides (surfaces) of the casing 26 at ends in the direction of arrow B. A front side panel 28*a* and a back side panel 28*b*, each of which have a horizontally elongated plate-like shape, form two sides (surfaces) of the casing 26 at ends in the direction of arrow A. An upper side panel 30*a* and a lower side panel 30*b* form two sides (surfaces) of the casing 26 at ends in the direction of arrow C. The upper side panel 30*a* and the lower side panel 30*b* each have a horizontally elongated plate-like shape.

Tapped holes 32 are formed in end surfaces of the edge portions of the first end plate 18*a* and the second end plate 18*b*. Holes 34 are formed in the front side panel 28*a*, the back side panel 28*b*, the upper side panel 30*a*, and the lower side panel 30*b* at positions corresponding to those of the tapped holes 32. When screws 36 are inserted into the holes 34 and screwed into the tapped holes 32, the panels of the casing 26 are integrally fixed to each other.

Figure 3:
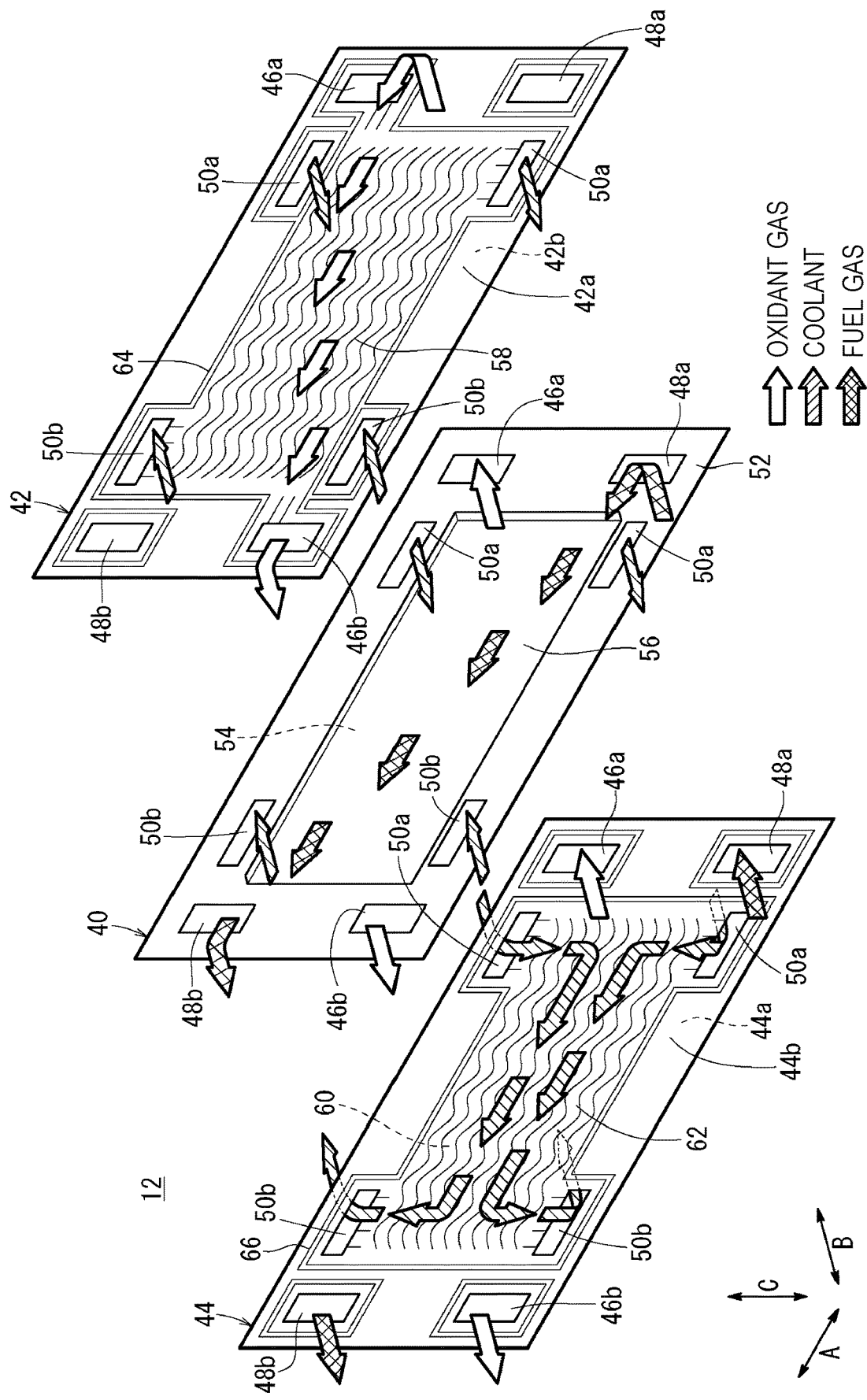
FIG. 3 is an exploded perspective view of a power generation cell of the fuel cell stack.

Referring to FIG. 3, each of the power generation cells 12 includes a membrane electrode assembly 40, a first metal separator 42, and a second metal separator 44. The first and second metal separators 42 and 44 sandwich the membrane electrode assembly 40.

Each of the first metal separator 42 and the second metal separator 44 is made from, for example, a steel plate, a stainless steel plate, an aluminum plate, a galvanized steel plate, or any of such metal plates whose surface is anticorrosive coated. Each of the first metal separator 42 and the second metal separator 44, which is made by press-forming a thin metal plate, has a rectangular shape in plan view and an undulating shape in cross-sectional view. For example, carbon separators may be used as the first metal separator 42 and the second metal separator 44.

An oxidant gas supply manifold 46*a* and a fuel gas supply manifold 48*a* extend in the direction of arrow B through one end portion of the power generation cell 12 in the longitudinal direction (direction of arrow A). An oxidant gas, such as an oxygen-containing gas, is supplied through the oxidant gas supply manifold 46*a*. A fuel gas, such as a hydrogen-containing gas, is supplied through the fuel gas supply manifold 48*a*.

A fuel gas discharge manifold 48*b* and an oxidant gas discharge manifold 46*b* extend in the direction of arrow B through the other end portion of the power generation cell 12 in the longitudinal direction. The fuel gas is discharged through the fuel gas discharge manifold 48*b*. The oxidant gas is discharged through the oxidant gas discharge manifold 46*b*.

A pair of coolant supply manifolds 50*a* extend in the direction of arrow B through one end portion of the power generation cell 12 in the transversal direction (direction of arrow C) (near the oxidant gas supply manifold 46*a*). The coolant supply manifolds 50*a*, through which a coolant is supplied, are formed in opposing upper and lower edge portions of the power generation cell 12 so as to extend in the direction of arrow B.

A pair of coolant discharge manifolds 50*b* extend in the direction of arrow B through the other end portion of the power generation cell 12 in the transversal direction (direction of arrow C) (near the fuel gas discharge manifold 48*b*). The coolant discharge manifolds 50*b*, through which the coolant is discharged, are formed in opposing upper and lower end portions of the power generation cell 12 so as to extend in the direction of arrow B.

The membrane electrode assembly 40 includes a solid polymer electrolyte membrane 52, a cathode electrode 54, and an anode electrode 56. The solid polymer electrolyte membrane 52 is, for example, a thin film that is made of a perfluorosulfonic acid polymer including water. The cathode electrode 54 and the anode electrode 56 sandwich the solid polymer electrolyte membrane 52. Instead of a fluorocarbon electrolyte membrane, a hydrocarbon (HC) electrolyte membrane may be used as the solid polymer electrolyte membrane 52.

The cathode electrode 54 and the anode electrode 56 each include a gas diffusion layer (not shown) and an electrode catalyst layer (not shown). The gas diffusion layer is made of carbon paper or the like. The electrode catalyst layer is formed by uniformly coating a surface of the gas diffusion layer with porous carbon particles whose surfaces support a platinum alloy. The electrode catalyst layers are disposed on both sides of the solid polymer electrolyte membrane 52.

An oxidant gas channel 58, which connects the oxidant gas supply manifold 46a to the oxidant gas discharge manifold 46b, is formed on a surface 42a of the first metal separator 42 facing the membrane electrode assembly 40. The oxidant gas channel 58 includes a plurality of wave-shaped channel grooves (or linear channel grooves) extending in the direction of arrow A.

A fuel gas channel 60, which connects the fuel gas supply manifold 48a to the fuel gas discharge manifold 48b, is formed on a surface 44a of the second metal separator 44 facing the membrane electrode assembly 40. The fuel gas channel 60 includes a plurality of wave-shaped channel grooves (or linear channel grooves) extending in the direction of arrow A.

A coolant channel 62, which is connected to the pair of coolant supply manifolds 50a and the pair of coolant discharge manifolds 50b, is formed between a surface 44b of the second metal separator 44 of the power generation cell 12 and a surface 42b of the first metal separator 42 of an adjacent power generation cell 12. The coolant channel 62 extends in the horizontal direction and allows the coolant to flow through a region corresponding to the electrodes of the membrane electrode assembly 40.

A first sealing member 64 is integrally formed on the surfaces 42a and 42b of the first metal separator 42 so as to surround the outer periphery of the first metal separator 42. A second sealing member 66 is integrally formed on the surfaces 44a and 44b of the second metal separator 44 so as to surround the outer periphery of the second metal separator 44.

Each of the first sealing member 64 and the second sealing member 66 is made of an elastic material such as a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

Referring to FIG. 2, an oxidant gas supply manifold end member 68a, an oxidant gas discharge manifold end member 68b, a fuel gas supply manifold end member 70a, and a fuel gas discharge manifold end member 70b are attached to the first end plate 18a. The oxidant gas supply manifold end member 68a, the oxidant gas discharge manifold end member 68b, the fuel gas supply manifold end member 70a, and the fuel gas discharge manifold end member 70b are each made of an electrically insulating resin.

The oxidant gas supply manifold end member 68a and the oxidant gas discharge manifold end member 68b are respectively connected to the oxidant gas supply manifold 46a and the oxidant gas discharge manifold 46b. The fuel gas supply manifold end member 70a and the fuel gas discharge manifold end member 70b are respectively connected to the fuel gas supply manifold 48a and the fuel gas discharge manifold 48b.

Referring to FIG. 1, a coolant supply manifold end member 72a (coolant manifold end member), which is made of a resin, is attached to the second end plate 18b (one of the end plates). The coolant supply manifold end member 72a is connected to the pair of upper and lower coolant supply manifolds 50a. A coolant discharge manifold end member 72b (coolant manifold end member), which is made of a resin, is attached to the second end plate 18b. Preferably, the coolant supply manifold end member 72a and the coolant discharge manifold end member 72b have electrically insulating properties.

Figure 4:
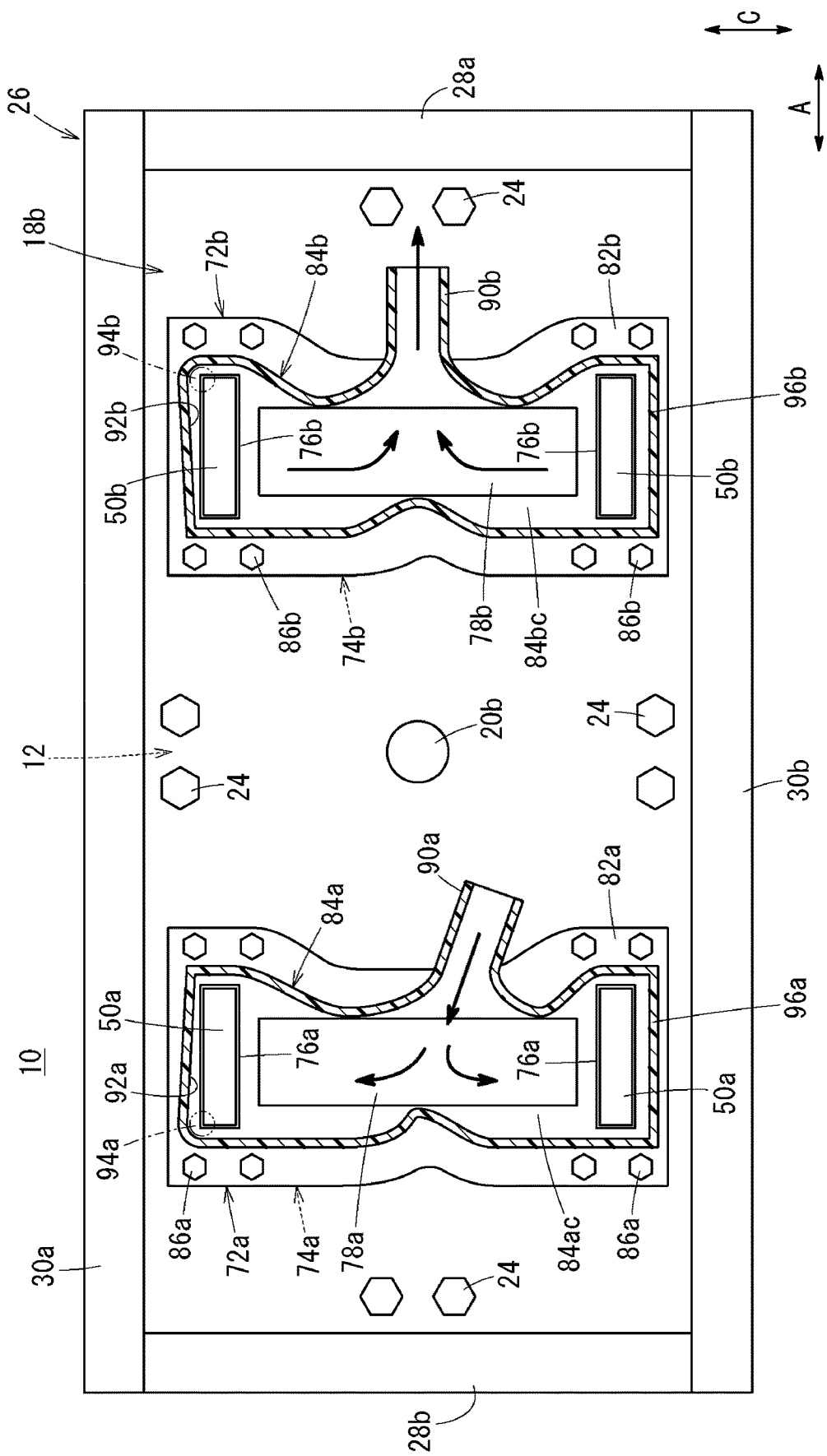
FIG. 4 is plan view of the fuel cell stack, showing the coolant manifold end members.
Figure 5:
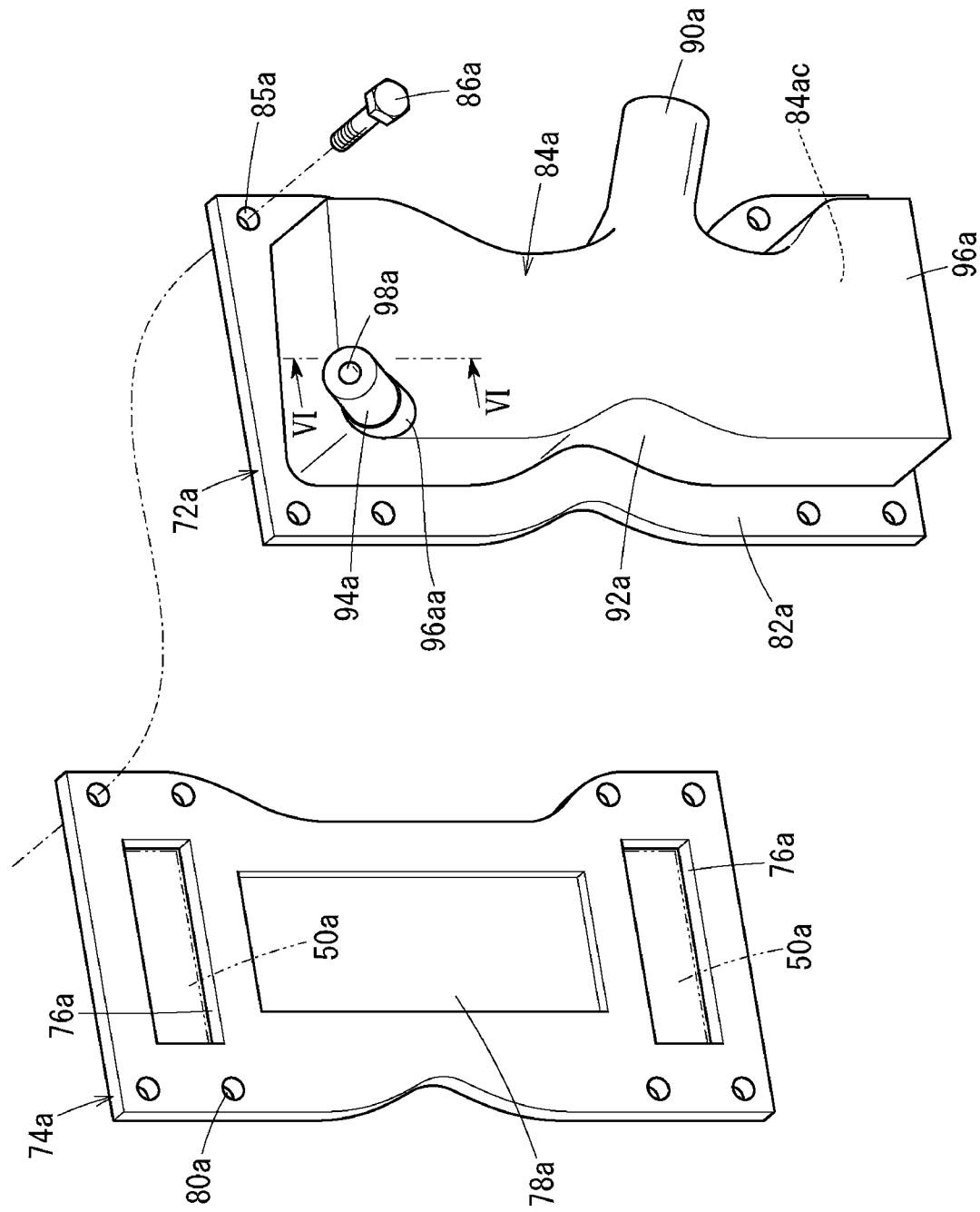
FIG. 5 is an exploded perspective view of one of the coolant supply manifold end members and an insulation plate of the fuel cell stack.

Referring to FIGS. 1, 4 and 5, the coolant supply manifold end member 72a is fixed to the second end plate 18b in such a way that an insulation plate 74a, which is made of an electrically insulating resin, is interposed therebetween. Referring to FIG. 5, the insulation plate 74a has a substantially flat plate-like shape. The insulation plate 74a has an upper coolant inlet 76a, which is connected to the upper coolant supply manifold 50a, and a lower coolant inlet 76a, which is connected to the lower coolant supply manifold 50a.

The insulation plate 74a has a recessed portion 78a, which has a substantially rectangular shape, between the upper and lower coolant inlets 76a. A plurality of holes 80a are formed in the outer peripheral edge portion of the insulation plate 74a.

Referring to FIGS. 1, 4 and 5, the coolant supply manifold end member 72a includes a flange 82a and a manifold body 84a, which are integrated with each other. The manifold body 84a has an inner space 84ac, and the flange 82a surrounds the inner space 84ac.

Referring to FIG. 5, a plurality of holes 85a are formed in the flange 82a so as to correspond to the holes 80a. The coolant supply manifold end member 72a is fixed to the second end plate 18b by inserting screws 86a into the holes 85a and driving the screws 86a into tapped holes 88a formed in the second end plate 18b (see FIG. 1).

Referring to FIG. 4, an inlet pipe 90a, which is a coolant supply opening, is formed at a substantially central part of the coolant supply manifold end member 72a (substantially central part in the channel-width direction of the coolant channel 62). The inlet pipe 90a is inclined downward with respect to the direction in which the coolant flows through the coolant channel 62 (direction of arrow A). Alternatively, the inlet pipe 90a may be inclined upward with respect to the direction of arrow A.

An upper wall surface 92a, which is inclined with respect to the horizontal direction, forms the ceiling of the inner space 84ac of the manifold body 84a. To be specific, the upper wall surface 92a is inclined outward and upward as seen from the center of the second end plate 18b. A first air vent pipe 94a protrudes from the manifold body 84a at a position near the uppermost position of the upper wall surface 92a (the uppermost position in the coolant supply manifold end member 72a).

Figure 6:
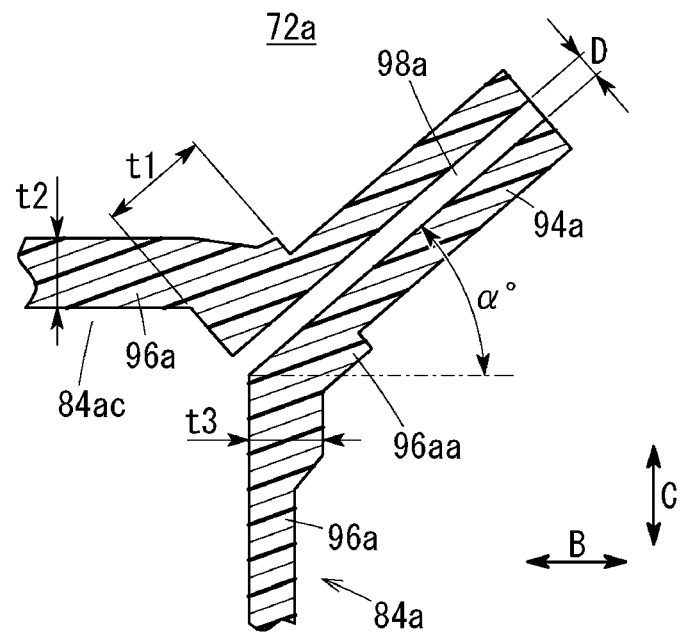
FIG. 6 is a sectional view of the coolant supply manifold end member taken along line VI-VI in FIG. 5.

The manifold body 84a includes a wall 96a. Referring to FIG. 5, the wall 96a includes a first air vent wall 96aa at an uppermost position thereof. The first air vent pipe 94a is integrally formed with the first air vent wall 96aa so as to protrude from the first air vent wall 96*aa*. Referring to FIG. 6, the first air vent pipe 94*a* is inclined upward at a predetermined angle α° with respect to the horizontal direction (direction of arrow B).

The thickness t1 of the first air vent wall 96*aa* is greater than the thicknesses t2 and t3 of parts of the wall 96*a* around the first air vent wall 96*aa* (t1>t2, t1>t3). The thicknesses t2 and t3 may be the same as or different from each other. A vent hole 98*a* extends through the first air vent wall 96*aa* and the first air vent pipe 94*a*. One end of the vent hole 98*a* is open at the uppermost position in the inner space 84*ac*, and the other end of the vent hole 98*a* is open to the outside. The diameter D of the vent hole 98*a* is set as small as possible.

Referring to FIG. 1, the coolant discharge manifold end member 72*b* is fixed to the second end plate 18*b* in such a way that an insulation plate 74*b*, which is made of an electrically insulating resin, is interposed therebetween. Elements of the coolant discharge manifold end member 72*b* that are the same as those of the coolant supply manifold end member 72*a* will be denoted by the same numerals with "b" instead of "a", and detailed descriptions of such elements will be omitted.

An outlet pipe 90*b*, which is a coolant discharge opening, is formed at a substantially central part of the coolant discharge manifold end member 72*b* in the direction of arrow C (substantially central part in the channel-width direction of the coolant channel 62). The outlet pipe 90*b* extends in the horizontal direction or is inclined with respect to the horizontal direction.

Referring to FIG. 4, an upper wall surface 92*b*, which is inclined with respect to the horizontal direction, forms the ceiling of an inner space 84*bc* of a manifold body 84*b*. To be specific, the upper wall surface 92*b* is inclined outward and upward as seen from the center of the second end plate 18*b*. A second air vent pipe 94*b* protrudes from the manifold body 84*b* at a position near the uppermost position of the upper wall surface 92*b* (the uppermost position in the coolant discharge manifold end member 72*b*).

The manifold body 84*b* includes a wall 96*b*. Referring to FIG. 1, the wall 96*b* includes a second air vent wall 96*bb* at an uppermost position thereof. The second air vent pipe 94*b* is integrally formed with the second air vent wall 96*bb* so as to protrude from the second air vent wall 96*bb*. The thickness of the second air vent wall 96*bb* is greater than the thickness of a part of the wall 96*b* around the second air vent wall 96*bb*.

An operation of the fuel cell stack 10, which is structured as described above, will be described.

Referring to FIG. 2, an oxidant gas, such as an oxygen-containing gas, is supplied from the oxidant gas supply manifold end member 68*a* on the first end plate 18*a* to the oxidant gas supply manifold 46*a*. A fuel gas, such as a hydrogen-containing gas, is supplied from the fuel gas supply manifold end member 70*a* on the first end plate 18*a* to the fuel gas supply manifold 48*a*.

Referring to FIG. 1, a coolant, such as pure water, ethylene glycol, or an oil, is supplied from the inlet pipe 90*a* of the coolant supply manifold end member 72*a* on the second end plate 18*b* to the inner space 84*ac*. The coolant is supplied to the coolant supply manifolds 50*a*, which are connected to upper and lower parts of the inner space 84*ac*.

Referring to FIG. 3, the oxidant gas flows from the oxidant gas supply manifold 46*a* into the oxidant gas channel 58 of the first metal separator 42. The oxidant gas flows along the oxidant gas channel 58 in the direction of arrow A, and is supplied to the cathode electrode 54 of the membrane electrode assembly 40.

The fuel gas is supplied from the fuel gas supply manifold 48*a* to the fuel gas channel 60 of the second metal separator 44. The fuel gas flows along the fuel gas channel 60 in the direction of arrow A, and is supplied to the anode electrode 56 of the membrane electrode assembly 40.

In the membrane electrode assembly 40, the oxidant gas supplied to the cathode electrode 54 and the fuel gas supplied to the anode electrode 56 are consumed by electrochemical reactions in the electrode catalyst layers, and thereby electric power is generated.

The oxidant gas supplied to the cathode electrode 54 of the membrane electrode assembly 40 and partially consumed is discharged along the oxidant gas discharge manifold 46*b* in the direction of arrow B. The fuel gas supplied to the anode electrode 56 of the membrane electrode assembly 40 and partially consumed is discharged along the fuel gas discharge manifold 48*b* in the direction of arrow B.

The coolant supplied to the upper and lower coolant supply manifolds 50*a* flows into the coolant channel 62 between the first metal separator 42 and the second metal separator 44 that are located adjacent to each other. The coolant temporarily flows from the upper and lower coolant supply manifolds 50*a* so as to become closer to each other in the directions of arrow C, and cools the membrane electrode assembly 40 while flowing in the direction of arrow A. Then, the coolant flows outward in the direction of arrow C so as to become separated from each other, and is discharged along the upper and lower coolant discharge manifolds 50*b* in the direction of arrow B.

Referring to FIGS. 1 and 4, the coolant is discharged from the upper and lower coolant discharge manifolds 50*b* to the inner space 84*bc* of the coolant discharge manifold end member 72*b*. The coolant flows toward the center of the inner space 84*bc*, and is discharged from the outlet pipe 90*b* to the outside.

According to the present embodiment, in the coolant supply manifold end member 72*a*, the first air vent pipe 94*a* is integrally formed with the first air vent wall 96*aa*, which is located at the uppermost position of the wall 96*a* of the manifold body 84*a*, so as to protrude from the first air vent wall 96*aa*. Referring to FIG. 6, the thickness t1 of the first air vent wall 96*aa* is greater than the thicknesses t2 and t3 of parts of the wall 96*a* around the first air vent wall 96*aa*.

Figure 7:
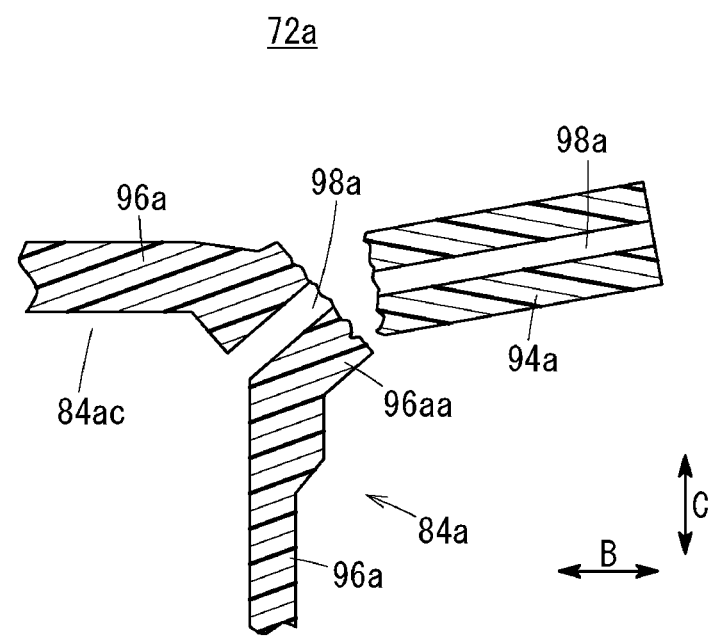
FIG. 7 is a sectional view of the coolant supply manifold end member when a part of the coolant supply manifold end member is broken.

Therefore, even when an external load (impact) is applied to the first air vent pipe 94*a* and the first air vent pipe 94*a* becomes broken as illustrated in FIG. 7, the first air vent wall 96*aa* still has a thickness greater than that of the other portion of the wall 96*a*. Accordingly, an advantage is obtained in that the first air vent wall 96*aa*, having the vent hole 98*a*, can maintain a sufficient liquid junction resistance (insulation resistance) even when the first air vent pipe 94*a* is broken.

Moreover, the vent hole 98*a* extends through the first air vent wall 96*aa* and the first air vent pipe 94*a*, and the diameter D of the vent hole 98*a* is set as small as possible (see FIG. 6). Thus, even when the first air vent pipe 94*a* becomes broken, the first air vent wall 96*aa* can maintain a better liquid junction resistance (insulation resistance).

In the coolant discharge manifold end member 72*b*, the second air vent pipe 94*b* is integrally formed with the second air vent wall 96*bb*, which is disposed at the uppermost position of the wall 96*b* of the manifold body 84*b*, so as to protrude from the second air vent wall 96*bb*. Therefore, an advantage is obtained in that the second air vent wall 96*bb* can maintain a sufficient liquid junction resistance (insulation resistance) even when the second air vent pipe 94b becomes broken.

According to the present disclosure, a fuel cell stack includes a stack of power generation cells that are stacked in a stacking direction that is a horizontal direction, each of the power generation cells including a membrane electrode assembly and separators that are stacked in the horizontal direction, the membrane electrode assembly including an electrolyte membrane and electrodes disposed on both sides of the electrolyte membrane. The fuel cell stack includes end plates that are disposed at both ends of the stack of power generation cells in the stacking direction; a coolant channel that is formed between each pair of the separators that are adjacent to each other and through which a coolant flows along surfaces of the pair of separators; and a coolant manifold that is connected to the coolant channel and through which the coolant flows in the stacking direction of the fuel cells.

The fuel cell stack includes a coolant manifold end member that is disposed on one of the end plates and that is connected to the coolant manifold; and an air vent pipe that is integrally formed with an upper part of the coolant manifold end member so as to protrude from the upper part, the air vent pipe being open at an uppermost position inside the coolant manifold end member. The coolant manifold end member includes an air vent wall from which the air vent pipe protrudes, and a thickness of the air vent wall is greater than a thickness a part of a wall of the coolant manifold end member around the air vent wall.

Preferably, the coolant manifold includes a pair of upper and lower coolant supply manifolds that are located near an inlet of the coolant channel with the coolant channel therebetween in a channel-width direction. Preferably, the coolant manifold includes a pair of upper and lower coolant discharge manifolds that are located near an outlet of the coolant channel with the coolant channel therebetween in the channel-width direction.

In this case, preferably, the coolant manifold end member includes at least one of a coolant supply manifold end member that is connected to the pair of upper and lower coolant supply manifolds, and a coolant discharge manifold end member that is connected to the pair of upper and lower coolant discharge manifolds.

With the present disclosure, the coolant manifold end member includes the air vent wall from which the air vent pipe protrudes, and the thickness of the air vent wall is greater than the thickness of a part of the wall of the coolant manifold end member around the air vent wall. Accordingly, even when the air vent pipe is broken, a sufficient liquid junction resistance (insulation resistance) can be maintained, because the thickness of the air vent wall is large.

Obviously, numerous modifications and variations of the present invention are possible in light of the above teachings. It is therefore to be understood that within the scope of the appended claims, the invention may be practiced otherwise than as specifically described herein.

What is claimed is:
1. A fuel cell stack comprising:
a stack of power generation cells that are stacked in a stacking direction that is a horizontal direction, each of the power generation cells including a membrane electrode assembly and separators that are stacked in the horizontal direction, the membrane electrode assembly including an electrolyte membrane and electrodes disposed on both sides of the electrolyte membrane;
end plates that are disposed at both ends of the stack of power generation cells in the stacking direction;
a coolant channel that is formed between each pair of the separators that are adjacent to each other and through which a coolant flows along surfaces of the pair of separators;
a coolant manifold that is connected to the coolant channel and through which the coolant flows in the stacking direction of the fuel cells, the coolant manifold including a first coolant manifold and a second coolant manifold that are aligned in an alignment direction; and
a coolant manifold end member that is disposed on one of the end plates and that is connected to the first coolant manifold and the second coolant manifold, the coolant manifold end member having an end part such that the first coolant manifold is between the end part and the second coolant manifold in the alignment direction; and
an air vent pipe provided at the end part of the coolant manifold end member, the air vent pipe having a vent hole passing through a wall of the end part of the coolant manifold in an extending direction to be open at the end part inside the coolant manifold end member, the air vent pipe including a base and a protruding portion protruding from the base along the extending direction, the base having a cross-sectional area perpendicular to the extending direction larger than a cross-sectional area of the protruding portion perpendicular to the extending direction, the vent hole extending along a straight line to pass through the base and the protruding portion in the extending direction, the base being integrally formed with the end part of the coolant manifold end member and having a thickness in the extending direction greater than a thickness of a part of a wall of the coolant manifold end member around the base.

2. The fuel cell stack according to claim 1,
wherein the first coolant manifold includes an upper coolant supply manifold,
wherein the second coolant manifold includes a lower coolant supply manifold that is lower than the upper coolant supply manifold in a height direction along a height of the fuel cell stack,
wherein the upper coolant supply manifold and the lower coolant supply manifold are located near inlets of the coolant channel, the coolant channel being sandwiched by the upper coolant supply manifold and the lower coolant supply manifold in a channel-width direction, and
wherein the coolant manifold end member includes a coolant supply manifold end member that is connected to the upper coolant supply manifold and the lower coolant supply manifold.

3. The fuel cell stack according to claim 1,
wherein the first coolant manifold includes an upper coolant discharge manifold,
wherein the second coolant manifold includes a lower coolant discharge manifold that is lower than the upper coolant discharge manifold in a height direction along a height of the fuel cell stack,
wherein the upper coolant discharge manifold and the lower coolant discharge manifold are located near outlets of the coolant channel, the coolant channel being sandwiched by the upper coolant discharge manifold and the lower coolant discharge manifold in a channel-width direction, and
wherein the coolant manifold end member includes a coolant discharge manifold end member that is connected to the upper coolant discharge manifold and the lower coolant discharge manifold.

4. A fuel cell stack comprising:
power generation cells stacked in a stacking direction, each of the power generation cells comprising:
  a membrane electrode assembly comprising:
    an electrolyte membrane; and
    first and second electrodes sandwiching the electrolyte membrane in the stacking direction; and
  first and second separators sandwiching the membrane electrode assembly in the stacking direction;
a coolant channel provided between the first separator of a first power generation cell among the power generation cells and the second separator of a second power generation cell among the power generation cells which is adjacent to the first power generation cell, a coolant being to flow along the coolant channel;
first and second end plates sandwiching the power generation cells in the stacking direction;
a coolant manifold which is connected to the coolant channel and through which the coolant is to flow in the stacking direction, the coolant manifold including a first coolant manifold and a second coolant manifold that are aligned in an alignment direction;
a coolant manifold end member disposed on one of the first and second end plates and connected to the first coolant manifold and the second coolant manifold, the coolant manifold end member having an end part such that the first coolant manifold is between the end part and the second coolant manifold in the alignment direction; and
an air vent pipe provided at the end part of the coolant manifold end member, the air vent pipe having a vent hole passing through a wall of the end part of the coolant manifold in an extending direction to be open at the end part inside the coolant manifold end member, the air vent pipe including a base and a protruding portion protruding from the base along the extending direction, the base having a cross-sectional area perpendicular to the extending direction larger than a cross-sectional area of the protruding portion perpendicular to the extending direction, the vent hole extending along a straight line to pass through the base and the protruding portion in the extending direction, the base being integrally formed with the end part of the coolant manifold end member and having a thickness in the extending direction greater than a thickness of a part of a wall of the coolant manifold end member around the base.

5. The fuel cell stack according to claim 4,
wherein the first coolant manifold includes an upper coolant supply manifold,
wherein the second coolant manifold includes a lower coolant supply manifold that is lower than the upper coolant supply manifold in a height direction along a height of the fuel cell stack,
wherein the upper coolant supply manifold and the lower coolant supply manifold are connected to inlets of the coolant channel, the upper coolant supply manifold and lower coolant supply manifold sandwiching the coolant channel in a channel-width direction of the coolant channel, and
wherein the coolant manifold end member includes a coolant supply manifold end member that is connected to the upper coolant supply manifold and the lower coolant supply manifold.

6. The fuel cell stack according to claim 4,
wherein the stacking direction is a horizontal direction.

7. The fuel cell stack according to claim 4,
wherein the first coolant manifold includes an upper coolant discharge manifold,
wherein the second coolant manifold includes a lower coolant discharge manifold that is lower than the upper coolant discharge manifold in a height direction along a height of the fuel cell stack,
wherein the upper coolant discharge manifold and the lower coolant discharge manifold are connected to outlets of the coolant channel, the upper coolant discharge manifold and lower coolant discharge manifold sandwiching the coolant channel in a channel-width direction of the coolant channel, and
wherein the coolant manifold end member includes a coolant discharge manifold end member that is connected to the upper coolant discharge manifold and the lower coolant discharge manifold.

8. A fuel cell stack comprising:
a stack of power generation cells that are stacked in a stacking direction that is a horizontal direction, each of the power generation cells including a membrane electrode assembly and separators that are stacked in the horizontal direction, the membrane electrode assembly including an electrolyte membrane and electrodes disposed on both sides of the electrolyte membrane;
end plates that are disposed at both ends of the stack of power generation cells in the stacking direction;
a coolant channel that is formed between each pair of the separators that are adjacent to each other and through which a coolant flows along surfaces of the pair of separators;
a coolant manifold that is connected to the coolant channel and through which the coolant flows in the stacking direction of the fuel cells; and
a coolant manifold end member that is disposed on one of the end plates and that is connected to the coolant manifold, the coolant manifold end member comprising:
  a bottom wall;
  a top wall opposite to the bottom wall in a height direction along a height of the fuel cell stack, the top wall being inclined with respect to the horizontal direction perpendicular to the height direction, the top wall having a lower end and an upper end opposite to the lower end in the height direction; and
  an upper part adjacent to the upper end of the top wall; and
an air vent pipe provided at the upper part of the coolant manifold end member and having a vent hole passing through the air vent pipe in an extending direction to be open at the upper part of the coolant manifold end member, the air vent pipe including a base and a protruding portion protruding from the base along the extending direction, the base having a cross-sectional area perpendicular to the extending direction larger than a cross-sectional area of the protruding portion perpendicular to the extending direction, the vent hole extending along a straight line to pass through the base and the protruding portion in the extending direction, the base being integrally formed with the upper part of the coolant manifold end member and having a thickness in the extending direction greater than a thickness of a part of a wall of the coolant manifold end member around the base.

* * * * *